United States Patent
Koyama et al.

(10) Patent No.: US 10,030,117 B2
(45) Date of Patent: Jul. 24, 2018

(54) ALIPHATIC POLYESTER RESIN COMPOSITION AND ALIPHATIC POLYESTER RESIN MOLDED ARTICLE

(71) Applicant: KANEKA CORPORATION, Osaka-shi (JP)

(72) Inventors: Ryohei Koyama, Settsu (JP); Tetsuya Minami, Settsu (JP); Noriyuki Suzuki, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 15/028,627

(22) PCT Filed: Sep. 12, 2014

(86) PCT No.: PCT/JP2014/004735
§ 371 (c)(1),
(2) Date: Apr. 11, 2016

(87) PCT Pub. No.: WO2015/052876
PCT Pub. Date: Apr. 16, 2015

(65) Prior Publication Data
US 2016/0251494 A1   Sep. 1, 2016

(30) Foreign Application Priority Data

Oct. 11, 2013  (JP) ................................ 2013-213882
Jan. 31, 2014  (JP) ................................ 2014-016926

(51) Int. Cl.
| | |
|---|---|
| C08K 5/053 | (2006.01) |
| C08K 7/02 | (2006.01) |
| C08J 5/00 | (2006.01) |
| C08K 3/26 | (2006.01) |
| C08K 3/34 | (2006.01) |
| C08K 5/11 | (2006.01) |
| C08K 11/00 | (2006.01) |
| C08K 3/013 | (2018.01) |

(52) U.S. Cl.
CPC ............. *C08K 5/053* (2013.01); *C08J 5/00* (2013.01); *C08K 3/013* (2018.01); *C08K 3/26* (2013.01); *C08K 3/34* (2013.01); *C08K 5/11* (2013.01); *C08K 7/02* (2013.01); *C08K 11/00* (2013.01); *C08J 2367/00* (2013.01); *C08K 2003/265* (2013.01); *C08K 2201/014* (2013.01); *C08K 2201/018* (2013.01)

(58) Field of Classification Search
CPC . C08K 5/053; C08L 23/0861; C08L 23/0853; C08L 67/04; C08L 2201/06
See application file for complete search history.

(56) References Cited

U.S. PATENT DOCUMENTS

| | | | |
|---|---|---|---|
| 6,127,512 A * | 10/2000 | Asrar ..................... | C08K 3/22 528/271 |
| 6,544,607 B1 | 4/2003 | Kuroki et al. | |
| 9,340,659 B2 * | 5/2016 | Suzuki ................... | C08K 5/053 |
| 9,475,934 B2 * | 10/2016 | Abe ....................... | C08K 5/053 |
| 9,765,198 B2 * | 9/2017 | Koyama ................ | C08K 5/053 |
| 2010/0160505 A1 * | 6/2010 | Kumazawa ............ | C08L 67/04 524/112 |
| 2011/0008560 A1 * | 1/2011 | Dabbous ............... | C08K 5/0091 428/36.9 |
| 2011/0293938 A1 | 12/2011 | Takita et al. | |
| 2012/0065342 A1 * | 3/2012 | Hamaguchi ........... | C08G 63/88 525/437 |

FOREIGN PATENT DOCUMENTS

| | | |
|---|---|---|
| CN | 103289171 A | 9/2013 |
| EP | 2 907 850 A1 | 8/2015 |
| EP | 2 913 360 A1 | 9/2015 |
| EP | 3 000 846 A1 | 3/2016 |
| EP | 3 018 173 A1 | 5/2016 |
| JP | 3-277656 A | 12/1991 |
| JP | 6-299054 A | 10/1994 |
| JP | 8-27363 A | 1/1996 |
| JP | 9-278991 A | 10/1997 |
| JP | 10-158369 A | 6/1998 |
| JP | 11-5849 A | 1/1999 |
| JP | 11-116783 A | 4/1999 |
| JP | 2000-302956 A | 10/2000 |
| JP | 2003-192884 A | 7/2003 |
| JP | 2003-238779 A | 8/2003 |
| JP | 2003-327803 A | 11/2003 |
| JP | 2007-77232 A | 3/2007 |
| JP | 2007-517126 A | 6/2007 |
| JP | 2007231184 * | 9/2007 |

(Continued)

OTHER PUBLICATIONS

Doi, Y., et al.; Macromolecules, 1995, p. 4822-4828.*
International Search Report dated Oct. 21, 2014 in PCT/JP2014/004735.
International Preliminary Report on Patentability and Written Opinion dated Apr. 12, 2016 in PCT/JP2014/004735.
Extended European Search Report dated May 23, 2017 in Patent Application No. 14851988.7.

(Continued)

*Primary Examiner* — Robert Jones, Jr.
(74) *Attorney, Agent, or Firm* — Oblon, McClelland, Maier & Neustadt, L.L.P.

(57) ABSTRACT

An object of the present invention is to: improve slowness of crystallization that is a drawback of polyhydroxyalkanoate; suppress bloom of a nucleating agent or the like; and improve surface smoothness and mold transferability of an obtained molded body.

The present invention provides an aliphatic polyester resin composition including polyhydroxyalkanoate (A), pentaerythritol (B), and a filler (C).

20 Claims, No Drawings

(56) References Cited

FOREIGN PATENT DOCUMENTS

| JP | 2008-094871 A | 4/2008 |
|---|---|---|
| JP | 2009-24058 A | 2/2009 |
| JP | 2010-229407 A | 10/2010 |
| JP | 2012-177011 A | 9/2012 |
| WO | WO 2005/066256 A1 | 7/2005 |
| WO | WO 2008/099586 A1 | 8/2008 |
| WO | WO 2010/067543 A1 | 6/2010 |
| WO | WO 2014/068943 A1 | 5/2014 |
| WO | WO2014/125764 A1 | 8/2014 |

* cited by examiner

ALIPHATIC POLYESTER RESIN COMPOSITION AND ALIPHATIC POLYESTER RESIN MOLDED ARTICLE

TECHNICAL FIELD

The present invention relates to an aliphatic polyester resin composition, more particularly relates to an aliphatic polyester resin composition for allowing a biodegradable polyester resin, which is digested by the action of microorganisms, to be used as various industrial materials, and a molded article containing such an aliphatic polyester resin composition.

BACKGROUND ART

In recent years, biodegradable plastics have been actively developed as materials that can solve problems caused by plastic waste that places a heavy burden on the global environment, such as impact on the ecosystem, generation of harmful gases during combustion, and global warming due to a large amount of heat generated by combustion.

In particular, carbon dioxide generated by combustion of plant-derived biodegradable plastics was originally present in the air, and therefore the amount of carbon dioxide in the air does not increase. This is referred to as carbon neutral, and is regarded as important under the Kyoto Protocol that sets carbon dioxide reduction targets. For this reason, biodegradable plastics have been expected to be actively used.

Recently, from the viewpoint of biodegradability and carbon neutral, aliphatic polyester resins, especially polyhydroxyalkanoate (hereinafter, sometimes referred to as PHA) resins have received attention as plant-derived plastics. Among PHA resins, for example, poly(3-hydroxybutyrate) homopolymer resins (hereinafter, sometimes referred to as P3HB), poly(3-hydroxybutyrate-co-3-hydroxyvalerate) copolymer resins (hereinafter, sometimes referred to as P3HB3HV), poly(3-hydroxybutyrate-co-3-hydroxyhexanoate) copolymer resins (hereinafter, sometimes referred to as P3HB3HH), poly(3-hydroxybutyrate-co-4-hydroxybutyrate) copolymer resins (hereinafter, sometimes referred to as P3HB4HB), and polylactic acid have received attention.

However, such PHA resin has a slow crystallization speed, and therefore its molding processing requires a long cooling time for solidification after heat-melting, which causes problems such as poor productivity and temporal change in mechanical properties with passage of time (especially, toughness such as tensile elongation at break) due to secondary crystallization that occurs after molding.

In order to solve such problems, addition of an inorganic substance such as boron nitride, titanium oxide, talc, lamellar silicate, calcium carbonate, sodium chloride, or metal phosphate to the PHA resin has heretofore been proposed to promote crystallization. However, addition of such an inorganic substance has many negative effects such as reduction in the tensile elongation of a resulting molded article, and poor appearance of the surface of the molded article, and therefore its effect is inadequate.

Other methods have been proposed to promote the crystallization of the PHA resin. Examples of such methods include: one in which a natural product-derived sugar alcohol compound such as erythritol, galactitol, mannitol, or arabitol is added (PTL 1); and one in which polyvinyl alcohol, chitin, or chitosan is added (PTL 2). However, the fact is that a practically effective crystal nucleating agent has not yet been found.

CITATION LIST

Patent Literature

PTL 1: Pamphlet of International Publication No. 2008/099586
PTL 2: Japanese Laid-Open Patent Application Publication No. 2007-077232

SUMMARY OF INVENTION

Technical Problem

The present inventors have found that the slowness of crystallization that is a drawback of a biodegradable polyester, especially polyhydroxyalkanoate, decomposed into water and carbon dioxide by the action of microorganisms can be improved by mixing pentaerythritol as a nucleating agent. The present inventors have further found that regarding organic compound-based nucleating agents such as pentaerythritol, a phenomenon (bloom) in which the nucleating agent oozes from the surface of the molded body when the molded body is used may occur depending on processing conditions, the combination of materials, or the like.

An object of the present invention is to: improve crystallization and solidification properties of polyhydroxyalkanoate in molding processing such as injection molding or blow molding to improve a processing speed; suppress the bloom (hereinafter may be referred to as "bleedout") of the nucleating agent or the like; improve surface smoothness of the obtained molded body; and improve mold transferability by the improvement of the surface smoothness.

Solution to Problem

The present inventors have diligently studied to solve the above problems, and as a result, have found that by mixing filler together with pentaerythritol as the nucleating agent, the crystallization speed of polyhydroxyalkanoate can be significantly improved, the bloom of the nucleating agent and the like can be suppressed, the surface smoothness of the obtained molded body can be improved, and the mold transferability can be improved by the improvement of the surface smoothness, which has led to the completion of the present invention.

To be specific, the present invention relates to an aliphatic polyester resin composition including polyhydroxyalkanoate (A), pentaerythritol (B), and filler (C).

Preferably, an amount of filler (C) is 1 to 100 parts by weight with respect to 100 parts by weight of the polyhydroxyalkanoate (A).

Preferably, an amount of pentaerythritol (B) is 0.05 to 20 parts by weight with respect to 100 parts by weight of the polyhydroxyalkanoate (A).

Preferably, the filler (C) is an inorganic filler.

Preferably, the inorganic filler includes at least one selected from silicate, carbonate, sulfate, phosphate, oxide, hydroxide, nitride, and carbon black.

Preferably, the filler (C) is an organic filler.

Preferably, the organic filler is made from at least one selected from a woody material and an organic fiber.

Preferably, the aliphatic polyester resin composition further includes a plasticizer (D).

Preferably, an amount of plasticizer (D) is 1 to 30 parts by weight with respect to 100 parts by weight of the polyhydroxyalkanoate (A).

Preferably, the plasticizer (D) is a modified glycerin-based compound.

Preferably, the modified glycerin-based compound includes at least one selected from glycerol diacetate monolaurate, glycerol diacetate monooleate, glycerol monoacetate monostearate, glycerol diacetate monocaprylate, glycerol diacetate monodecanoate, and glycerol triacetate.

Preferably, the polyhydroxyalkanoate (A) includes a repeating unit represented by general formula (1) below,

$$[\text{—CHR—CH}_2\text{—CO—O—}] \quad (1)$$

where R denotes an alkyl group represented by $C_nH_{2n+1}$, and n is an integer of 1 or more and 15 or less.

Preferably, the polyhydroxyalkanoate (A) includes at least one selected from poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), poly(3-hydroxybutyrate-co-4-hydroxybutyrate), and polylactic acid.

Further, the present invention relates to an aliphatic polyester resin molded article obtained by molding the aliphatic polyester resin composition.

Advantageous Effects of Invention

The present invention can significantly improve the crystallization speed of polyhydroxyalkanoate, improve the crystallization and solidification properties in the molding processing such as injection molding or blow molding to improve the processing speed, suppress the bloom, improve the surface smoothness of the obtained molded body, and improve the mold transferability by the improvement of the surface smoothness.

DESCRIPTION OF EMBODIMENTS

Hereinafter, the present invention will be explained in detail.

Polyhydroxyalkanoate (A)

The polyhydroxyalkanoate (A) used in the present invention is at least one selected from microorganism-derived PHAs produced by microorganisms.

In the present invention, the PHA (A) is aliphatic polyester resin including a repeating unit represented by a general formula: [—CHR—CH$_2$—CO—O—].

It is preferable that the PHA (A) used in the present invention includes a repeating unit represented by Formula (1): [—CHR—CH$_2$—CO—O—] (where R is an alkyl group represented by $C_nH_{2n+1}$ and n is an integer of 1 or more and 15 or less).

The microorganisms that produce the microorganism-derived PHA (A) are not particularly limited as long as they have the ability to produce PHAs. For example, *Bacillus megaterium* is a poly(3-hydroxybutyrate) (hereinafter, may be abbreviated as "PHB")-producing microorganism first discovered in 1925, and natural microorganisms such as *Cupriavidus necator* (formerly classified as *Alcaligenes eutrophus*, *Ralstonia eutropha*) and *Alcaligenes latus* are known as other PHB-producing microorganisms. These microorganisms accumulate PHB in their cells.

Further, known microorganisms that produce copolymers of hydroxybutyrate and another hydroxyalkanoate are, for example, *Aeromonas caviae* that produces poly(3-hydroxybutyrate-co-3-hydroxyvalerate) (hereinafter, may be abbreviated as "PHBV") and poly(3-hydroxybutyrate-co-3-hydroxyhexanoate) (hereinafter, may be abbreviated as "PHBH") and *Alcaligenes eutrophus* that produces poly(3-hydroxybutyrate-co-4-hydroxybutyrate). Particularly, a preferred PHBH-producing microorganism is, for example, *Alcaligenes eutrophus* AC32, FERM BP-6038 (T. Fukui, Y. Doi, J. Bateriol., 179, p. 4821-4830 (1997)) produced by introducing a PHA synthase gene to improve PHBH productivity. These microorganisms are cultured under appropriate conditions, and the thus obtained cells having PHBH accumulated therein are used. Other than the above microorganisms, genetically-modified microorganisms may also be used which are produced by introducing various PHA synthesis-related genes depending on the desired type of PHA (A) to be produced. In this case, culture conditions including the type of a substrate may be optimized.

The molecular weight of the microorganism-derived PHA used in the present invention is not particularly limited as long as the microorganism-derived PHA virtually sufficiently exhibits its mechanical properties for the intended use. If the molecular weight is too low, a resulting molded article has low strength. On the other hand, if the molecular weight is too high, processability is reduced and therefore molding is difficult. In consideration of such facts, the weight-average molecular weight of the microorganism-derived PHA (A) used in the present invention is preferably in the range of 50,000 to 3,000,000, more preferably in the range of 100,000 to 1,500,000.

The weight-average molecular weight can be determined as a molecular weight in terms of polystyrene by gel permeation chromatography (GPC) ("Shodex GPC-101" manufactured by Showa Denko K.K.) using a polystyrene gel column ("Shodex K-804" manufactured by Showa Denko K.K.) and chloroform as a mobile phase. In this case, a calibration curve is prepared using polystyrenes having weight-average molecular weights of 31,400, 197,000, 668,000, and 1,920,000. In the GPC, a column appropriate for measuring the above-mentioned molecular weight may be used.

Examples of the microorganism-derived PHA (A) used in the present invention include: PHB (poly(3-hydroxybutyrate), poly(3-hydroxybutyric acid)); PHBH (poly(3-hydroxybutyrate-co-3-hydroxyhexanoate), poly(3-hydroxybutyric acid-co-3-hydroxyhexanoic acid)); PHBV (poly(3-hydroxybutyrate-co-3-hydroxyvalerate), poly(3-hydroxybutyric acid-co-3-hydroxyvaleric acid)); P3HB3HV3HH (poly(3-hydroxybutyrate-co-3-hydroxyvalerate-co-3-hydroxyhexanoate), poly(3-hydroxybutyric acid-co-3-hydroxyvaleric acid-co-3-hydroxyhexanoic acid)); P3HB4HB (poly(3-hydroxybutyrate-co-4-hydroxybutyrate), poly(3-hydroxybutyric acid-co-4-hydroxybutyric acid)); poly(3-hydroxybutyrate-co-3-hydroxyoctanoate); poly(3-hydroxybutyrate-co-3-hydroxyoctadecanoate); and polylactic acid. Among these, PHB, PHBH, PHBV, P3HB3HV3HH, P3HB4HB, and polylactic acid are preferable since they are industrially easily produced.

As for the composition ratio of the repeating unit of the microorganism-derived PHA (A), the composition ratio of 3-hydroxybutyrate (3HB) is preferably 80 mol % to 99 mol %, more preferably 85 mol % to 97 mol % from the viewpoint of balance between flexibility and strength. If the composition ratio of 3-hydroxybutyrate (3HB) is less than 80 mol %, stiffness tends to be poor, and if the composition ratio of 3-hydroxybutyrate (3HB) is more than 99 mol %, flexibility tends to be poor.

Each composition ratio as a repeating unit in the PHA (A) copolymer resin can be measured by gas chromatography in the following manner. Two milliliters of a sulfuric acid/methanol mixed solution (15/85 (weight ratio)) and 2 mL of chloroform are added to about 20 mg of dried PHA, and the mixture is hermetically sealed and heated at 100° C. for 140 minutes to obtain a methyl ester as a PHA degradation product. After cooled, the methyl ester is neutralized by adding 1.5 g of sodium hydrogen carbonate little by little, and the mixture is allowed to stand until the generation of carbon dioxide is stopped. Four milliliters of diisopropyl ether is added to and well mixed with the mixture, and then the monomer unit composition of the PHA degradation product in the supernatant is analyzed by capillary gas chromatography. In this way, each composition ratio in the copolymer resin is determined.

A gas chromatograph and a capillary column used in the capillary gas chromatography are "GC-17A" manufactured by SHIMADZU CORPORATION and "NEUTRA BOND-1" manufactured by GL Sciences Inc. (column length: 25 m, column inner diameter: 0.25 mm, liquid membrane thickness: 0.4 µm), respectively. A carrier gas used is He, the pressure at column inlet is 100 kPa, and the amount of a sample injected is 1 µL. The capillary gas chromatography is performed under conditions where the temperature is increased from an initial temperature of 100° C. to 200° C. at a rate of 8° C./min and further increased from 200° C. to 290° C. at a rate of 30° C./min.

An aliphatic polyester resin composition according to the present invention uses pentaerythritol (B) as a crystal nucleating agent for the polyhydroxyalkanoate (A).

Pentaerythritol (B)

The pentaerythritol (B) is one of polyhydric alcohols represented by Formula (2) below and is an organic compound as white crystal with a melting point of 260.5° C.

[Chemical Formula 1]

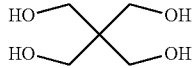
(2)

The pentaerythritol (B) is classified as a sugar alcohol, but is not derived from a natural product and can be synthesized by condensation of acetaldehyde and formaldehyde under basic conditions.

The pentaerythritol (B) used in the present invention is not generally particularly limited as long as it is commonly available, and may be one provided as a reagent or an industrial product. Examples of the reagent include, but are not limited to, those manufactured by Wako Pure Chemical Industries, Ltd., Sigma-Aldrich, Tokyo Chemical Industries Co., Ltd., and Merck. Examples of the industrial product include, but are not limited to, one manufactured by KOEI CHEMICAL CO., LTD., (trade name: Pentarit) and one manufactured by TOYO CHEMICALS CO., LTD.

Some commercially-available reagents and products contain, as impurities, oligomers generated by dehydration condensation of pentaerythritol, such as dipentaerythritol and tripentaerythritol. These oligomers are not effective for the crystallization of the polyhydroxyalkanoate (A), but do not inhibit the crystallization effect of the pentaerythritol (B). Therefore, the pentaerythritol (B) used in the present invention may contain such oligomers.

The amount of pentaerythritol (B) used in the present invention is not particularly limited as long as the crystallization of the polyhydroxyalkanoate (A) can be promoted. However, the amount of pentaerythritol (B) is preferably 0.05 to 20 parts by weight, more preferably 0.1 to 10 parts by weight, even more preferably 0.3 to 5 parts by weight with respect to 100 parts by weight of the polyhydroxyalkanoate (A). If the amount of pentaerythritol (B) is too small, the effect of the pentaerythritol (B) as a crystal nucleating agent cannot be obtained, and if the amount of pentaerythritol (B) is too large, there is a case where viscosity during melt-processing is reduced so that processing is difficult.

Filler (C)

The filler (C) in the present invention is filler typically used to improve the mechanical properties or an additive used to improve productivity.

The filler (C) used in the present invention is not especially limited as long as the effect of being able to suppress the bloom of pentaerythritol can be obtained. The filler (C) used in the present invention may be granular, fibrous, or the like and may be inorganic filler or organic filler.

One type of the filler (C) may be mixed, or two or more types of the fillers (C) may be mixed. The mixing ratio is suitably adjustable depending on the type of the polyhydroxyalkanoate (A) and a target effect.

The amount of filler (C) used in the present invention is not especially limited. However, the amount of filler (C) used in the present invention is preferably 1 to 100 parts by weight with respect to 100 parts by weight of the polyhydroxyalkanoate (A), more preferably 10 to 50 parts by weight with respect to 100 parts by weight of the polyhydroxyalkanoate (A), since the effect of improving the mechanical property while maintaining good appearance can be obtained, and the effects of suppressing the bloom and improving the surface smoothness and the mold transferability can be easily obtained. If the amount of filler is less than 1 part by weight, the bloom tends not to be suppressed. If the amount of filler exceeds 100 parts by weight, the resin which can contain the filler lacks. Therefore, the appearance may be such that the filler oozes form the surface of the molded body. Thus, the surface smoothness and the mold transferability tend to deteriorate.

From the viewpoint of availability (versatility), price, and processability (feed property) in addition to the effect of suppressing the bloom of pentaerythritol and the effect of improving the mechanical characteristic, the inorganic filler is preferably used as the filler (C).

Typically, a specific surface area of the inorganic filler is larger than that of the organic filler, and a size distribution of the inorganic filler is narrower than that of the organic filler. In this case, the inorganic filler is preferably used since the variations in the mechanical properties can be easily suppressed, and the surface smoothness and the mold transferability can be more easily obtained.

The inorganic filler is not especially limited. However, it is preferable that the inorganic filler include at least one selected from silicate, carbonate, sulfate, phosphate, oxide, hydroxide, nitride, and carbon black, since these are high in versatility, high in the effect of improving the mechanical strength, and small in particle diameter distribution and hardly inhibit the surface smoothness and the mold transferability.

Examples of silicate include: clay minerals such as talc, mica, kaolinite, and sericite; pyrophyllite; wollastonite; calcium silicate; magnesium silicate; and sodium silicate.

Examples of carbonate include: calcium carbonate; magnesium basic carbonate; sodium carbonate; barium carbonate; zinc carbonate; and ferric carbonate.

Examples of sulfate include: barium sulfate; calcium sulfate; and strontium sulphate.

Examples of phosphate include: calcium phosphate; zirconium phosphate; and aluminum phosphate.

Examples of oxide include: silicon dioxide; titanium oxide; aluminum oxide; zinc oxide; magnesium oxide; calcium oxide; zirconium oxide; antimony oxide; and iron oxide.

Examples of hydroxide include aluminum hydroxide and magnesium hydroxide.

Examples of nitride include boron nitride, silicon nitride, and aluminum nitride.

Among the inorganic fillers, talc, mica, kaolinite, calcium carbonate, barium sulfate, titanium oxide, boron nitride, and carbon black are especially preferable from the viewpoint of the availability and the effects.

One type of the inorganic filler may be mixed, or two or more types of the inorganic fillers may be mixed. The mixing ratio is suitably adjustable depending on the type of the polyhydroxyalkanoate (A) and the target effect.

The amount of oil absorption of the inorganic filler used in the present invention is 5 to 250 ml/100 g, and preferably 10 to 200 ml/100 g. If the amount of oil absorption is less than 5 ml/100 g, the pentaerythritol, the plasticizer, and the like tend to easily bleed. If the amount of oil absorption exceeds 250 ml/100 g, a large amount of plasticizer tends to be required to increase impact resistance.

A method of measuring the amount of oil absorption is based on JIS-K5101.

The amount of moisture of the inorganic filler used in the present invention is 0.01 to 10%, preferably 0.01 to 5%, and more preferably 0.01 to 1%. If the amount of moisture of the inorganic filler is less than 0.01%, a utility cost for reducing the moisture from the inorganic filler tends to increase. If the amount of moisture of the inorganic filler exceeds 10%, the molecular weight tends to decrease by promotion of hydrolysis of the polyhydroxyalkanoate (A).

A method of measuring the amount of moisture is based on J1S-K5101.

An average particle diameter of the inorganic filler used in the present invention is 0.1 to 100 μm, preferably 0.1 to 50 μm. If the average particle diameter is less than 0.1 μm, the handleability tends to deteriorate. If the average particle diameter exceeds 100 μm, the impact resistance tends to decrease.

In a method of measuring the average particle diameter, a laser diffraction/scattering device such as "Microtrac MT3100II" produced by Nikkiso Co., Ltd. is used.

A method of measuring the amount of oil absorption is based on JIS-K5101.

The inorganic filler used in the present invention also serves as a nucleating agent. Therefore, by causing the inorganic filler to coexist with the pentaerythritol (B), the crystallization can be further promoted, and the processability can be improved.

Hereinafter, examples of the inorganic filler used in the present invention will be described.

Examples of talc used as the inorganic filler include general-purpose talc and surface treatment talc. Specific examples of talc include: "Micro Ace" (trademark) produced by Nippon Talc Co., Ltd.; "Talcum Powder" (trademark) produced by Hayashi-Kasei Co., Ltd.; talc produced by Takehara Kagaku Kogyo Co., Ltd.; and talc produced by Maruo Calcium Co., Ltd.

Examples of mica used as the inorganic filler include wet-pulverized mica and dry-pulverized mica. Specific examples of mica include mica produced by Yamaguchi Mica Co., Ltd. and mica produced by Keiwa Rozai Co., Ltd.

Examples of kaolinite used as the inorganic filler include dry kaolin, calcined kaolin, and wet kaolin. Specific examples of kaolinite include "TRANSLINK" (trademark), "ASP" (trademark), "SANTINTONE" (trademark), and "ULTREX" (trademark) produced by Hayashi-Kasei Co., Ltd. and kaolinite produced by Keiwa Rozai Co., Ltd.

Examples of calcium carbonate used as the inorganic filler include heavy calcium carbonate and soft calcium carbonate. Specific examples of calcium carbonate include "Sunlight" (trademark) and "White Seal" (trademark) produced by Takehara Kagaku Kogyo Co., Ltd., calcium carbonate produced by Maruo Calcium Co., Ltd., and calcium carbonate produced by Shiraishi Calcium Kaisha, Ltd.

Examples of barium sulfate used as the inorganic filler include precipitated barium sulfate and pulverized barium sulfate. Specific examples of barium sulfate include barium sulfate produced by Takehara Kagaku Kogyo Co., Ltd. and barium sulfate produced by Sakai Chemical Industry Co., Ltd.

Examples of titanium oxide used as the inorganic filler include rutile type titanium oxide and anatase type titanium oxide. Specific examples of titanium oxide include titanium oxide produced by Ishihara Sangyo Kaisha, Ltd, titanium oxide produced by Sakai Chemical Industry Co., Ltd., and titanium oxide produced by Fuji Titanium Industry Co., Ltd.

Examples of boron nitride used as the inorganic filler include hexagonal boron nitride and cubic boron nitride. Specific examples of boron nitride include "SHOBN" (trademark) produced by Showa Denko K.K., boron nitride produced by Denki Kagaku Kogyo Kabushiki Kaisha, boron nitride produced by ESK Ceramics, and boron nitride produced by MOMENTIVE.

Examples of carbon black used as the inorganic filler include furnace black, channel black, acetylene black, and thermal black. Specific examples of carbon black include carbon blacks produced by Asahi Carbon Co., Ltd., Mitsubishi Carbon Black Co., Ltd., Tokai Carbon Co., Ltd., Shinnikka Carbon Co., Ltd., and Cabot Japan K.K.

It is preferable to use the organic filler as the filler (C) since the organic filler has the effect of suppressing the bloom of pentaerythritol and the effect of improving the mechanical properties and is high in availability and low in price, and in addition, the organic filler hardly causes hydrolysis of polyester resin by isolation of ionic groups.

Typically, the specific gravity of the organic filler is smaller than that of the inorganic filler, and the aspect ratio of the organic filler is higher than that of the inorganic filler. In this case, it is more preferable to use the organic filler since the organic filler has the effect of improving the mechanical properties.

One type of the organic filler may be mixed, or two or more types of the organic fillers may be mixed. The mixing ratio is suitably adjustable depending on the type of the polyhydroxyalkanoate (A) and the target effect.

Examples of a material used for the organic filler include: (a) naturally-derived materials, such as woody materials (wood chips, wood powder, saw dust, etc.), rice, rice flour, starch, cornstarch, rice straw, straw, and natural rubber; (b) organic fibers, such as natural fibers and synthetic fibers, made of organic matters; and (c) synthetic resin materials, such as polyester, polyacryl, polyamide, nylon, polyethylene, polyolefin, polyvinyl alcohol, polyvinyl chloride, polyurethane, polyacetal, aramid, PBO (poly-p-phenylene benzobisoxazole), polyphenylene sulfide, acetyl cellulose, polybenzazole, polyarylate, polyvinyl acetate, and synthetic rubber.

Among the organic fillers, from the viewpoint of compatibility with polyhydroxyalkanoate, it is preferable to use at least one selected from the naturally-derived material, the organic fiber, polyacryl, and polyvinyl chloride. Further, among these, from the viewpoint of the cost improvement and the availability, it is preferable to use at least one selected from the woody material and the organic fiber, and from the viewpoint of the biodegradability, it is preferable to use at least one selected from the woody material and the natural fiber.

Both the natural fiber and the synthetic fiber can be used as the organic fiber.

Both vegetable natural fiber and animal natural fiber can be used as the natural fiber. Examples of the vegetable natural fiber include kenaf fiber, abaca fiber, bamboo fiber, jute fiber, hemp fiber, linen fiber, henequen (sisal hemp), ramie fiber, hemp, cotton, banana fiber, coconut fiber, palm, palm, paper mulberry, oriental paperbush, and bagasse. Examples of the vegetable natural fiber further include regenerated fiber, such as pulp, cellulose fiber, and rayon, processed from the vegetable fiber. Examples of the animal natural fiber include wool, silk, cashmere, and mohair.

Examples of the synthetic fiber include polyamide fiber, polyester fiber, polyester fiber, nylon fiber, polyacryl, polyarylate fiber, fluorine fiber, polyvinyl alcohol, polyvinyl chloride, polyolefin, polyurethane, acetyl cellulose, polybenzazole, and PBO (poly-p-phenylene benzobisoxazole) fiber.

Among the above organic fibers, it is preferable to use the natural fiber for the purpose of obtaining a high biobased content in a composite with polyhydroxyalkanoate and not inhibiting environmental performance. Further, it is more preferable to use the vegetable natural fiber since the cost required for culture is low.

Only one among these fibers may be used, or two or more among these fibers may be used together.

Fineness of the fiber is not especially limited. It is preferable to use the fiber having suitable fineness depending on usage or the like.

When the cost improvement is a main purpose in addition to the suppressing of the bloom of pentaerythritol, the average particle diameter (equivalent circle diameter) of the organic filler used in the present invention is such a large average particle diameter that does not deteriorate the desired mechanical property, the surface smoothness of the molded body, or the mold transferability of the molded body. For example, the average particle diameter (equivalent circle diameter) of the organic filler used in the present invention is preferably several micrometers to several millimeters. When the filler is added together with the plasticizer to improve the mechanical property, especially the impact resistance, the average particle diameter is 0.1 to 150 μm, preferably 0.1 to 50 μm. If the average particle diameter is less than 0.1 μm, handleability tends to deteriorate. If the average particle diameter exceeds 150 μm, the impact resistance tends to decrease.

In the method of measuring the size of the filler, for example, a laser diffraction/scattering device such as "Microtrac MT3100II" produced by Nikkiso Co., Ltd. is used. Especially when the filler is fiber, the size of the filler can be obtained by calculation in such a manner that: the obtained pellet or molded article is dissolved in a solvent (such as chloroform) and then filtrated and washed; the residue is observed by an optical microscope or a scanning electron microscope; and the lengths of 100 fibers are measured.

The amount of moisture of the organic filler used in the present invention is 0.01 to 10%, preferably 0.01 to 5%, more preferably 0.01 to 2%. If the amount of moisture is less than 0.01%, the utility cost for reducing the moisture tends to increase. If the amount of moisture exceeds 10%, the molecular weight tends to decrease by promotion of the hydrolysis of the polyhydroxyalkanoate (A), and drawbacks such as voids tend to be formed on the molded body by poor dispersion or foaming of the filler.

The method of measuring the amount of moisture is based on JIS-K5101.

The organic filler used in the present invention also serves as a nucleating agent. Therefore, by causing the organic filler to coexist with the pentaerythritol (B), the crystallization can be further promoted, and the processability can be improved.

Hereinafter, examples of the organic filler used in the present invention will be described.

Examples of cellulose fiber used as the organic filler include: "TC150" produced by CreaFill Fibers Corp.; Fibra-Cel SW series, BH series, and CBR series produced by Celite; cellulose fiber produced by Terracel TM; and cellulose fiber produced by American Wood Fibers.

Examples of wood powder used as the organic filler include wood powder produced by Nitto Funka Trading Co., Ltd. and cellulosin produced by Watanabe Chemical Co., Ltd.

Plasticizer (D)

It is preferable that the aliphatic polyester resin composition of the present invention further include the plasticizer (D) in addition to the polyhydroxyalkanoate (A), the pentaerythritol (B), and the filler (C). This is because the mechanical property, especially the impact resistance, improves by the plasticizer (D).

The plasticizer (D) used in the present invention is not especially limited as long as the effect of improving the mechanical property, especially the impact resistance can be obtained when the plasticizer (D) is used together with the filler (C). However, the plasticizer (D) is preferably a compound including ester bond. Specific examples of the plasticizer (D) include modified glycerin-based compound, adipic acid ester-based compound, polyether ester-based compound, benzoic acid ester-based compound, phthalic acid ester-based compound, isosorbide ester-based compound, and polycaprolactone-based compound.

The modified glycerin-based compound is preferable as the plasticizer (D) since the modified glycerin-based compound excels in cost and versatility and is high in biobased content.

A glycerol ester-based compound is preferable as the modified glycerin-based compound. Each of glycerol monoester, glycerol diester, and glycerol triester can be used as the glycerol ester-based compound. However, from the viewpoint of the improvement of the mechanical property, glycerol triester is preferable. Among glycerol triesters, glycerol diacetate monoester is especially preferable. Specific examples of glycerol diacetate monoester include glycerol diacetate monolaurate, glycerol diacetate monooleate, glycerol diacetate monostearate, glycerol diacetate monocaprylate, glycerol diacetate monodecanoate, glycerol triacetate, glycerol tricaprylate, and glycerol monocaprylic monocaprin monolaurate.

Further, from the viewpoint of the compatibility with PHA, glycerol diacetate monolaurate, glycerol diacetate monooleate, glycerol monoacetate monostearate, glycerol diacetate monocaprylate, glycerol diacetate monodecanoate, and glycerol triacetate are preferable.

Glycerol diacetate monoester-based compound, adipic acid ester-based compound, polyether ester-based compound, benzoic acid ester-based compound, and the like can be preferably used as the plasticizer (D) since these excel in affinity with a resin component and hardly bleeds. Diethylhexyl adipate, dioctyl adipate, and diisononyl adipate can be preferably used as the adipic acid ester-based compound, and polyethylene glycol dibenzoate, polyethylene glycol dicaprylate, and polyethylene glycol diisostearate can be preferably used as the polyether ester-based compound.

Epoxidized soybean oil, epoxidized fatty acid 2-ethylhexyl, sebacic acid-based monoester, and the like, each of which contains a large amount of biomass-derived components, can be preferably used since they can increase the biobased content of the entire composition.

Examples of the modified glycerin-based compound include "Rikemal" (trademark) produced by Riken Vitamin Co., Ltd. and "Coconard" (trademark) produced by Kao Corporation.

One type of the plasticizer (D) may be mixed, or two or more types of the plasticizers (D) may be mixed. The mixing ratio is suitably adjustable depending on the type of the hydroxyalkanoate (A) and the target effect.

The amount of plasticizer (D) blended in the present invention is preferably 1 to 30 parts by weight with respect to 100 parts by weight of the hydroxyalkanoate (A) and more preferably 3 to 20 parts by weight with respect to 100 parts by weight of the hydroxyalkanoate (A). If the amount of plasticizer (D) blended is less than 1 part by weight, the improvement effect of the impact resistance tends to be low. If the amount of plasticizer (D) blended exceeds 30 parts by weight, the bloom by the plasticizer tends to easily occur.

Aliphatic Polyester Resin Composition

Since the aliphatic polyester resin composition of the present invention includes the pentaerythritol (B), the aliphatic polyester resin composition of the present invention is superior to only the polyhydroxyalkanoate (A) or a resin composition containing the polyhydroxyalkanoate (A) and a sugar alcohol compound other than the pentaerythritol (B) in that its crystallization during processing stably proceeds under a wider range of processing conditions. Therefore, the aliphatic polyester resin composition of the present invention has the following advantages.

Among the polyhydroxyalkanoates (A), when poly(3-hydroxybutyrate-co-3-hydroxyhexanoate) (PHBH), poly(3-hydroxybutyrate-co-3-hydroxyvalerate) (PHBV), or the like is crystallized by cooling after heat-melting, the proceeding of crystallization is influenced by the temperature of the resin during melting. That is, the crystallization of the resin tends to be less likely to proceed when the temperature of the resin during melting is higher. For example, in the case of PHBH, when the temperature of the resin during melting is in the range from the melting point of the resin to about 170° C., the crystallization of the resin during cooling tends to be less likely to proceed when the temperature of the resin during melting is higher. Further, when the temperature of the resin during melting is about 180° C. or higher, the crystallization of the resin during cooling tends to proceed over several hours. Therefore, in order to successfully perform molding processing, the temperature of the resin during melting needs to be controlled to fall within the range from about 170° C. to 180° C. However, the temperature of the resin during melting is not uniform in general molding processing, and therefore it is very difficult to control the temperature of the resin to fall within the above range.

The crystallization of the aliphatic polyester resin composition according to the present invention stably proceeds over a wide temperature range of the resin during melting. Specifically, even when the temperature of the resin during melting falls within the range from the melting point of the resin to about 190° C., crystallization stably and quickly proceeds, and therefore the resin composition according to the present invention has excellent processability over a wide range of processing conditions. From the viewpoint of thermal degradation, it is not preferred that melt-processing is performed at a resin melt temperature of 200° C. or higher.

Further, the proceeding of crystallization of the polyhydroxyalkanoate (A) depends also on cooling temperature. For example, the crystallization of PHBH tends to most proceed when the cooling temperature after heat-melting is 50° C. to 70° C. If the cooling temperature is lower than 50° C. or higher than 70° C., crystallization tends to be less likely to proceed. In general molding processing, mold temperature correlates with cooling temperature, and therefore needs to be controlled to fall within the above temperature range from 50° C. to 70° C. However, in order to control the mold temperature to be uniform, the structure or shape of a mold needs to be strictly designed, which is very difficult.

The crystallization of the aliphatic polyester resin composition according to the present invention stably proceeds over a wide cooling temperature range of the resin after melting. Specifically, even when the cooling temperature after heat-melting falls within the range from 20° C. to 80° C., crystallization stably and quickly proceeds, and therefore the resin composition according to the present invention has excellent processability over a wide range of processing conditions.

The aliphatic polyester resin composition according to the present invention has the above-described advantages that cannot be achieved by a conventional polyhydroxyalkanoate resin or a conventional resin composition containing a polyhydroxyalkanoate resin and a sugar alcohol compound other than the pentaerythritol (B), and therefore its processability is excellent in that the temperature of the resin during melting or the cooling temperature of a mold or the like can be set over a wide range.

The crystallization of the aliphatic polyester resin composition according to the present invention stably and quickly proceeds, and therefore the following characteristics are developed.

For example, in the case of PHBH, its crystallization does not sufficiently proceed during molding, and therefore gradually proceeds even after molding so that spherocrystals grow, which tends to change the mechanical properties of a molded article with time and gradually make the molded article brittle. However, the aliphatic polyester resin composition according to the present invention is excellent in the stability of product quality, because many microcrystals are formed just after molding, and therefore spherocrystals are less likely to grow after molding, which suppresses embrittlement of a molded article.

Further, there is a gap in the joint between cavities in a mold for injection molding (e.g., parting line part, insert part, slide core sliding part), and therefore the gap is filled with a molten resin during injection molding so that a molded article has "burr". The polyhydroxyalkanoate (A) is slow in crystallization and has flowability for a long period of time, and therefore burr is likely to be formed and post-processing of a molded article requires a lot of effort. However, the aliphatic polyester resin composition according to the present invention is preferred from a practical viewpoint because it is quickly crystallized, and therefore burr is less likely to be formed and effort required for post-processing of a molded article can be reduced.

The aliphatic polyester resin composition according to the present invention can be easily produced by a known melt-kneading machine as long as the melt-kneading machine can achieve heating to a temperature equal to or higher than the melting point of polyhydroxyalkanoate and kneading. For example, a method can be used in which the polyhydroxyalkanoate (A), the pentaerythritol (B), the filler (C), and if necessary, another component are melt-kneaded with an extruder, a roll mill, a Banbury mixer, or the like to form pellets and the pellets are molded or in which a masterbatch containing the pentaerythritol (B) and the filler (C) in a high concentration is previously prepared and mixed with the polyhydroxyalkanoate (A) in a desired ratio, and the mixture is melt-kneaded and molded.

The polyhydroxyalkanoate (A), the pentaerythritol (B), and the inorganic filler (C) may be added to a kneading machine at the same time, or the pentaerythritol (B) and the filler (C) may be added after polyhydroxyalkanoate is melted.

It is preferable to add the filler at last since the properties of the obtained resin composition or molded body are not deteriorated. To be specific, it is preferable to add the filler (C) to the resin composition obtained by melting and kneading the polyhydroxyalkanoate (A) and the pentaerythritol (B) in a desired ratio. Typically, the inorganic filler such as talc or calcium carbonate contains moisture and shows alkalinity. Therefore, when the filler (C) coexists with the polyhydroxyalkanoate (A) at high temperature, decomposition of polyhydroxyalkanoate may be promoted, so that the mechanical property of the resin composition may be deteriorated, and coloring may occur. On this account, the filler is added at last.

Further, when a retention time during melting and kneading is long, the organic filler such as the woody material or the organic fiber may be carbonized, burned, and blackened. On this account, the filler is added at last.

Specifically, for example, when producing the resin composition by an intermeshed co-rotation twin screw extruder, it is preferable that the polyhydroxyalkanoate (A) and the pentaerythritol (B) be added from the base of a screw, and the filler (C) be added from a downstream of the extruder by side feed or the like.

The thus obtained aliphatic polyester resin composition according to the present invention is subjected to various processing steps to produce a product. The method of processing may be a known method, and examples thereof include injection molding, blow molding, and extrusion forming.

Especially, since the aliphatic polyester resin composition according to the present invention is a resin composition having high impact resistance, the injection molding by which the improvement of the mechanical property by orientation of the polymer chain or the like is hardly obtained can be preferably used.

The processing conditions are not especially limited as long as the temperature of the resin is not a temperature that causes the heat deterioration of polyhydroxyalkanoate, that is, the temperature of the resin does not exceed 200° C.

The aliphatic polyester resin composition according to the present invention may contain, in addition to the polyhydroxyalkanoate (A), the pentaerythritol (B), and the filler (C), another component such as: the plasticizer (D); antioxidant; ultraviolet absorber; colorant such as dye or pigment; lubricant; or antistatic agent. The amount of such another component to be added is not particularly limited as long as the effects of the polyhydroxyalkanoate (A), the pentaerythritol (B), and the filler (C) are not impaired.

Method of Producing Aliphatic Polyester Resin Molded Article

Hereinbelow, a method of producing an aliphatic polyester resin molded article containing the aliphatic polyester resin composition according to the present invention will be exemplified.

First, the polyhydroxyalkanoate (A), the pentaerythritol (B), the inorganic filler (C), and if necessary, another component are mixed and melt-kneaded using an extruder, a kneader, a Banbury mixer, a roll, or the like to prepare an aliphatic polyester resin composition. Then, the aliphatic polyester resin composition is extruded in the form of a strand and cut to obtain particulate aliphatic polyester resin composition pellets in the form of a cylinder, elliptic cylinder, sphere, cube, rectangular parallelepiped, or the like.

The temperature of the above-described melt-kneading of the polyhydroxyalkanoate (A), the pentaerythritol (B), or the like depends on, for example, the melting point or melt viscosity of the polyhydroxyalkanoate (A) used, but the resin temperature of the melt-kneaded product at the outlet of a die is preferably 140 to 200° C., more preferably 150 to 195° C., even more preferably 160 to 190° C. If the resin temperature of the melt-kneaded product is less than 140° C., there is a case where poor dispersion of additives such as the pentaerythritol (A) and the inorganic filler (C) occurs, and if the resin temperature of the melt-kneaded product exceeds 200° C., there is a case where the polyhydroxyalkanoate (A) is thermally decomposed.

The pellets prepared by the above method are sufficiently dried at 40 to 80° C. to remove moisture, and then the dried pellets can be subjected to molding processing by a known molding processing method to obtain any molded article. Examples of the molding processing method include film forming, sheet forming, injection molding, blow molding, fiber spinning, extrusion foaming, and bead foaming.

Examples of a method for producing a molded film include T-die extrusion forming, calender molding, roll molding, and inflation forming. However, the film forming method is not limited thereto. The molding temperature during film forming is preferably 140 to 190° C. Further, the film formed from the aliphatic polyester resin composition according to the present invention can be subjected to hot forming by heating, vacuum molding, or press molding.

Examples of a method for producing an injection molded article include injection molding methods such as an injection molding method commonly used to mold a thermoplastic resin, a gas-assist molding method, and an injection compression molding method. Further, depending on the purposes, methods other than the above methods may also be used, such as an in-mold forming method, a gas-press molding method, a two-color molding method, a sandwich molding method, PUSH-PULL, and SCORIM. However, the injection molding methods are not limited thereto. The molding temperature during injection molding is preferably 140 to 190° C., and the temperature of a mold is preferably 20 to 80° C., more preferably 30 to 70° C.

The aliphatic polyester resin composition according to the present invention is excellent in processability, can be processed in a short time, and is suitable for use as a base material for, for example, dishes, agricultural materials, parts for OA equipment, parts for home appliances, members for cars, daily goods, stationery, various molded bottles, extruded sheets, and profile-extruded products.

EXAMPLES

Hereinbelow, the present invention will be specifically described with reference to Examples, but the technical scope of the present invention is not limited by these Examples.

Polyhydroxyalkanoate A1: one obtained in Production Example 1 was used.

Production Example 1

KNK-005 strain (see U.S. Pat. No. 7,384,766) was used for culture production.

A seed culture medium (pH 6.8) had the following composition: 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$.

A preculture medium had the following composition: 1.1 w/v % $Na_2HPO_4.12H_2O$ 0.19 w/v % $KH_2PO_4$, 1.29 w/v % $(NH_4)_2SO_4$, 0.1 w/v % $MgSO_4.7H_2O$, and 0.5 v/v % trace metal salt solution (obtained by dissolving 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$ in 0.1 N hydrochloric acid). As a carbon source, palm oil was added at one time in a concentration of 10 g/L.

A PHA production medium had the following composition: 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$, 0.5 v/v % trace metal salt solution (obtained by dissolving 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2. 6H_2O$ in 0.1 N hydrochloric acid), and 0.05 w/v % BIOSPUREX200K (defoaming agent: manufactured by Cognis Japan Ltd.).

First, a glycerol stock of KNK-005 strain (50 μL) was inoculated into the seed culture medium (10 mL) and seed-cultured for 24 hours to obtain a seed culture. Then, the seed culture was inoculated at 1.0 v/v % into a 3-liter jar fermenter (MDL-300 manufactured by B. E. MARUBISHI Co., Ltd.) containing 1.8 L of the preculture medium. The jar fermenter was operated under conditions of a culture temperature of 33° C., a stirring speed of 500 rpm, and a ventilation volume of 1.8 L/min to perform preculture for 28 hours while pH was controlled to fall within the range from 6.7 to 6.8 to obtain a preculture. The pH control was performed using a 14% aqueous ammonium hydroxide solution.

Then, the preculture liquid was inoculated at 1.0 v/v % into a 10-liter jar fermenter (MDS-1000 manufactured by B. E. MARUBISHI Co., Ltd.) containing 6 L of the production medium. The jar fermenter was operated under conditions of a culture temperature of 28° C., a stirring speed of 400 rpm, and a ventilation volume of 6.0 L/min, and pH was controlled to fall within the range from 6.7 to 6.8. The pH control was performed using a 14% aqueous ammonium hydroxide solution. As a carbon source, palm oil was used. The culture was performed for 64 hours. After the completion of culture, cells were collected by centrifugation, washed with methanol, and freeze-dried, and the weight of the dried cells was measured.

One hundred mL of chloroform was added to 1 g of the obtained dried cells, and the mixture was stirred at room temperature all day and night to extract PHA in the cells. The cell debris was filtered out, and then the filtrate was concentrated by an evaporator until its total volume was reduced to 30 mL. Then, 90 mL of hexane was gradually added, and the mixture was allowed to stand for 1 hour while being slowly stirred. The precipitated PHA was collected by filtration and then vacuum-dried at 50° C. for 3 hours. In this way, PHA was obtained. The 3HH content of the obtained PHA was measured by gas chromatography in the following manner. Two milliliters of a sulfuric acid/methanol mixed solution (15:85) and 2 mL of chloroform were added to 20 mg of the dried PHA, and the mixture was hermetically sealed and heated at 100° C. for 140 minutes to obtain a methyl ester as a PHA degradation product. After cooled, the methyl ester was neutralized by adding 1.5 g of sodium hydrogen carbonate little by little, and the mixture was allowed to stand until the generation of carbon dioxide was stopped. The mixture was well mixed with 4 mL of diisopropyl ether and then centrifuged, and then the monomer unit composition of the aliphatic polyester degradation product in the supernatant was analyzed by capillary gas chromatography. A gas chromatograph and a capillary column used were "GC-17A" manufactured by SHIMADZU CORPORATION and "NEUTRA BOND-1" manufactured by GL Sciences Inc. (column length: 25 m, column inner diameter: 0.25 mm, liquid membrane thickness: 0.4 μm), respectively. A carrier gas used was He, the pressure at column inlet was 100 kPa, and the amount of a sample injected was 1 ηL. The capillary gas chromatography was performed under conditions where the temperature was increased from an initial temperature of 100° C. to 200° C. at a rate of 8° C./min and further increased from 200° C. to 290° C. at a rate of 30° C./min. As a result of analysis under the above conditions, the PHA was found to be poly(3-hydroxybutyrate-co-3-hydroxyhexanoate) (PHBH) represented by the chemical formula (1). The composition ratio of 3-hydroxybutyrate (3HB) was 94.4 mol %, and the composition ratio of 3-hydroxyhexanoate (3HH) was 5.6 mol %.

After culture, PHBH was obtained from the culture liquid by a method described in WO 2010/067543. The weight-average molecular weight Mw of PHBH measured by GPC was 600,000.

Polyhydroxyalkanoate A2: one obtained in Production Example 2 was used.

Production Example 2

Polyhydroxyalkanoate A2 as a raw material and poly(3-hydroxybutyrate-co-3-hydroxyhexanoate) (PHBH) were obtained in the same manner as in Production Example 1 except that KNK-631 strain was used and palm kernel oil was used as the carbon source. The weight-average molecular weight Mw was 650,000. The composition ratio of 3HB was 88.6 mol %, and the composition ratio of 3HH was 11.4 mol %.

Polyhydroxyalkanoate A3: one obtained in Production Example 3 was used.

Production Example 3

C. necator H16 strain (ATCC 17699) was used as producing strain, and PHB having the weight-average molecular weight Mw of 850,000 was produced based on International Publication No. 09/145164.

Polyhydroxyalkanoate A4: EM5400F (poly(3-hydroxybutyrate-co-4-hydroxybutyrate) (P3HB4HB); the composition ratio of 3HB was 86 mol %, the composition ratio of 4HB was 14 mol %, and the weight-average molecular weight Mw was 1,050,000) produced by Ecomann was used.

Other materials used in Examples and Comparative Examples are shown below.

Inorganic fillers C1 to C8: the following products were used.

C1: Micro ace K-1 produced by Nippon Talc Co., Ltd. (talc having the average particle diameter of 8 μm, the amount of oil absorption of 35 ml/100 g, and the moisture of 0.2%)

C2: Micro ace MS-KY produced by Nippon Talc Co., Ltd. (talc having the average particle diameter of 23 μm, the amount of oil absorption of 21 ml/100 g, and the moisture of 0.1%)

C3: A-21S produced by Yamaguchi Mica Co., Ltd. (mica having the average particle diameter of 23 μm, the amount of oil absorption of 65 ml/100 g, and the moisture of 0.5%)

C4: A-41S produced by Yamaguchi Mica Co., Ltd. (mica having the average particle diameter of 47 μm, the amount of oil absorption of 40 ml/100 g, and the moisture of 0.3%)

C5: TRANSLINK 77 produced by Hayashi-Kasei Co., Ltd. (kaolin having the average particle diameter of 0.8 μm, the amount of oil absorption of 85 ml/100 g, and the moisture of 0.5%)

C6: Super #2000 produced by Maruo Calcium Co., Ltd. (calcium carbonate having the average particle diameter of 2 μm, the amount of oil absorption of 35 ml/100 g, and the moisture of 0.3%)

C7: W-1 produced by Takehara Kagaku Kogyo Co., Ltd. (barium sulfate having the average particle diameter of 1.5 μm, the amount of oil absorption of 10 ml/100 g, and the moisture of 0.2%)

C8: PolarTherm PT110 produced by MOMENTIVE (boron nitride having the average particle diameter of 45 μm)

Organic fillers C9 and 10: the following products were used.

C9: TC150 produced by CreaFill Fibers Corp. (cellulose fiber having a thickness of 1 to 2 μm, a width of 20 μm, and a length of 120 μm)

C10: Wood powder 200 mesh produced by Nitto Funka Trading Co., Ltd. (140 mesh passing amount=70.19%, 100 mesh passing amount=98.47%)

Plasticizers D1 and D2: the following products were used.

D1: Rikemal PL-012 produced by Riken Vitamin Co., Ltd. (glycerol diacetate monolaurate)

D2: Triacetin produced by Daicel Corporation (glycerol triacetate)

Example 1

Production of Aliphatic Polyester Resin Composition

The polyhydroxyalkanoate A1, the pentaerythritol (Pentarit T produced by Koei Chemical Co., Ltd.), and the inorganic filler C2 were melt-kneaded at compounding ratios shown in Table 1 (hereinafter, the compounding ratios in the table show parts by weight) using an intermeshed co-rotation twin screw extruder (TEM-26SS produced by Toshiba Machine Co., Ltd.) at a preset temperature of 120 to 160° C. (resin temperature at an outlet was 171° C.) and a screw rotation speed of 100 rpm. Thus, the aliphatic polyester resin composition was obtained. The temperature of the resin was measured with a K-type thermocouple in direct contact with the molten resin extruded through a die. The aliphatic polyester resin composition was extruded in the form of a strand through the die and cut into pellets.

Injection Molding

The obtained resin composition as a raw material was molded into bar-shaped specimens in accordance with ASTM D-256 and ASTM D-648 with the use of an injection molding machine (IS-75E produced by Toshiba Machine Co., Ltd.) under conditions where the cylinder preset temperature of the molding machine was 120 to 150° C. (resin temperature at an outlet was 168° C.), and the preset temperature of a mold was 55° C.

Demold Time

The processability of the aliphatic polyester resin composition according to the present invention was evaluated in terms of demold time in the injection molding. The demold time was defined as the time from when the resin was injected into the mold till when the specimen could be released from the opened mold by ejecting the specimen with an ejection pin without deformation. The shorter demold time means that the speed of crystallization is higher and molding processability has been improved. Results are shown in Table 1.

Surface Smoothness

A surface of the specimen obtained by the above injection molding was visually observed, and the surface smoothness of the specimen was evaluated based on a floating state of the filler. Results are shown in Table 1.

Excellent: the floating, buldging, fluffing, and depressions and projections of the filler are not formed, and the surface of the specimen is smooth.

Poor: the floating, buldging, fluffing, and depressions and projections of the filler are observed locally or widely on the surface of the specimen.

Evaluation of Bloom

The bar-shaped specimen obtained by the above injection molding was preserved for one month at a temperature of 23° C. and a humidity of 50%, and then, the surface of the bar-shaped specimen was touched by a finger. When the surface was not oily, it was regarded as "Excellent". When the surface was oily, it was regarded as "Poor." Results are shown in Table 1.

Examples 2 to 12

The pellet of the aliphatic polyester resin composition was produced at the compounding ratios shown in Table 1 in the same manner as in Example 1. The demold time in the injection molding, the surface smoothness of the specimen obtained by the injection molding, and the bloom were evaluated. Results are shown in Table 1.

Comparative Examples 1 to 3

The bar-shaped specimen of the aliphatic polyester resin composition was molded at the compounding ratios shown in Table 1 in the same manner as in Example 1. The demold time in the injection molding, the surface smoothness of the specimen obtained by the injection molding, and the bloom were evaluated. Results are shown in Table 1.

TABLE 1

| | | | | EXAMPLES | | | | | | | |
|---|---|---|---|---|---|---|---|---|---|---|---|
| | | | | 1 | 2 | 3 | 4 | 5 | 6 | 7 | 8 |
| Raw material | Polyhydroxy-alkanoate | A1 | PHBH | 100 | 100 | 100 | 100 | 100 | 100 | 100 | 100 |
| | | A2 | PHBH | | | | | | | | |
| | | A3 | PHB | | | | | | | | |
| | | A4 | P3HB4HB | | | | | | | | |
| | Filler | C2 | Talc | 30 | | | | | | 10 | 50 |
| | | C6 | Calcium carbonate | | 30 | | | | | | |
| | | C4 | Mica | | | 30 | | | | | |
| | | C9 | Cellulose fiber | | | | 30 | | | | 100 |
| | | C10 | Wood powder | | | | | 30 | | | |
| | Pentaerythritol | B | | 1 | 1 | 1 | 1 | 1 | 1 | 1 | 1 |
| Injection Molding State of Specimen | Mold time | second | | 20 | 20 | 20 | 20 | 20 | 20 | 20 | 25 |
| | Surface smoothness | — | | Excellent | Excellent | Excellent | Excellent | Excellent | Excellent | Excellent | Excellent |
| | Bloom | | | Excellent | Excellent | Excellent | Excellent | Excellent | Excellent | Excellent | Excellent |

| | | | | EXAMPLES | | | | COMPARATIVE EXAMPLES | | |
|---|---|---|---|---|---|---|---|---|---|---|
| | | | | 9 | 10 | 11 | 12 | 1 | 2 | 3 |
| Raw material | Polyhydroxy-alkanoate | A1 | PHBH | 100 | | | | 100 | 100 | 100 |
| | | A2 | PHBH | | 100 | | | | | |
| | | A3 | PHB | | | 100 | | | | |
| | | A4 | P3HB4HB | | | | 100 | | | |
| | Filler | C2 | Talc | | | 30 | | 30 | | |
| | | C6 | Calcium carbonate | | | | 30 | | | |
| | | C4 | Mica | | | | | | | |
| | | C9 | Cellulose fiber | | | 30 | | | 100 | |
| | | C10 | Wood powder | 50 | | | | | | |
| | Pentaerythritol | B | | 1 | 1.5 | 1 | 1.5 | 0 | 0 | 1 |
| Injection Molding State of Specimen | Mold time | second | | 25 | 25 | 20 | 25 | >60 | >60 | 20 |
| | Surface smoothness | — | | Excellent | Excellent | Excellent | Excellent | Poor | Poor | — |
| | Bloom | | | Excellent | Excellent | Excellent | Excellent | — | — | Poor |

As shown in Table 1, since pentaerythritol was not added in Comparative Examples 1 and 2, the demold time was more than 60 seconds. In Comparative Example 3, the demold time of the molded article was 20 seconds, that is, excellent. However, since the filler was not added, pentaerythritol was observed as the bloom on the surface of the molded article. On the other hand, both the filler and the pentaerythritol were used in Examples 1 to 12. As a result, the bloom was suppressed, and the surface smoothness was excellent.

It was found that by using both the pentaerythritol and the filler, the demold time became short, and in addition, the surface smoothness was excellent without any problem such as the floating of the filler on the surface of the specimen even when the filler was mixed, and the filler complementarily functioned to suppress the bloom of the pentaerythritol.

Example 13

Production of Aliphatic Polyester Resin Composition

The polyhydroxyalkanoate A1, the pentaerythritol (Pentarit T produced by Koei Chemical Co., Ltd.), the inorganic filler C1, and the plasticizer D1 were melt-kneaded at compounding ratios shown in Table 2 (hereinafter, the compounding ratios in the table show parts by weight) using an intermeshed co-rotation twin screw extruder (TEM-26SS produced by Toshiba Machine Co., Ltd.) at a preset temperature of 120 to 160° C. (resin temperature at an outlet was 171° C.) and a screw rotation speed of 100 rpm. Thus, the aliphatic polyester resin composition was obtained. The temperature of the resin was measured with a K-type thermocouple in direct contact with the molten resin extruded through a die. The aliphatic polyester resin composition was extruded in the form of a strand through the die and cut into pellets.

Demold Time

The bar-shaped specimen was molded using the obtained resin composition as a raw material by the injection molding machine in the same manner as in Example 1. The processability was evaluated by the demold time in the injection molding. Results are shown in Table 2.

Izod Impact Strength

The bar-shaped specimen obtained by the injection molding was preserved for one month at a temperature of 23° C. and a humidity of 50%, and then, Izod impact test at 23° C. was performed in accordance with ASTM D-256. Thus, Izod impact strength was measured. The higher the Izod impact strength is, the better. Results are shown in Table 2.

Deflection Temperature Under Load (HDT)

The bar-shaped specimen obtained by the injection molding was preserved for one month at a temperature of 23° C. and a humidity of 50%, and then, the deflection temperature under load (hereinafter may be referred to as "HDT") was measured in accordance with B method of ASTM D-648. The higher the deflection temperature under load is, the better, which means that the specimen has heat resistance. Results are shown in Table 2.

Evaluation of Bloom

The bloom was evaluated in the same manner as in Example 1. Results are shown in Table 2.

Examples 14 to 22

The pellet of the aliphatic polyester resin composition was produced at the compounding ratios shown in Table 2 in the same manner as in Example 13. The demold time in the injection molding, and the Izod impact strength and deflection temperature under load (HDT) of the specimen obtained by the injection molding were measured, and the bloom was evaluated. Results are shown in Table 2.

Comparative Examples 4 to 9

The pellet of the aliphatic polyester resin composition was produced at the compounding ratios shown in Table 2 in the same manner as in Example 13. The demold time in the injection molding, and the Izod impact strength and deflection temperature under load (HDT) of the specimen obtained by the injection molding were measured, and the bloom was evaluated. Results are shown in Table 2.

TABLE 2

| | | | | | | | Examples | | | | |
|---|---|---|---|---|---|---|---|---|---|---|---|
| | | | | 13 | 14 | 15 | 16 | 17 | 18 | 19 | 20 |
| Raw material | Polyhydroxy-alkanoate | A1 | | 100 | 100 | 100 | 100 | 100 | 100 | 100 | 100 |
| | Inorganic filler | C1 | | 30 | | | | | | | |
| | Inorganic filler | C2 | | | 30 | | | | | | |
| | Inorganic filler | C3 | | | | 30 | | | | | |
| | Inorganic filler | C4 | | | | | 30 | | | | |
| | Inorganic filler | C5 | | | | | | 30 | | | |
| | Inorganic filler | C6 | | | | | | | 30 | | |
| | Inorganic filler | C7 | | | | | | | | 30 | |
| | Inorganic filler | C8 | | | | | | | | | 30 |
| | Organic filler | C9 | | | | | | | | | |
| | Plasticizer | D1 | | 15 | 15 | 15 | 15 | 15 | 15 | 15 | 15 |
| | Pentaerythritol | — | | 1 | 1 | 1 | 1 | 1 | 1 | 1 | 1 |
| Injection molding | Mold time | second | | 20 | 20 | 20 | 20 | 20 | 20 | 25 | 25 |
| Mechanical property of specimen | Izod impact strength | J/m | | 61 | 39 | 75 | 71 | 41 | 44 | 52 | 52 |
| | HDT | ° C. | | 115 | 117 | 120 | 121 | 109 | 111 | 109 | 114 |
| State of specimen | Bloom | — | | Excellent | Excellent | Excellent | Excellent | Excellent | Excellent | Excellent | Excellent |

| | | | | Examples | | Comparative Examples | | | | | |
|---|---|---|---|---|---|---|---|---|---|---|---|
| | | | | 21 | 22 | 4 | 5 | 6 | 7 | 8 | 9 |
| Raw material | Polyhydroxy-alkanoate | A1 | | 100 | 100 | 100 | 100 | 100 | 100 | 100 | 100 |
| | Inorganic filler | C1 | | | 30 | | 30 | | 30 | | |
| | Inorganic filler | C2 | | | | | | | | | |
| | Inorganic filler | C3 | | | | | | | | | |
| | Inorganic filler | C4 | | | | | | | | | |
| | Inorganic filler | C5 | | | | | | | | | |
| | Inorganic filler | C6 | | | | | | | | | |
| | Inorganic filler | C7 | | | | | | | | | |
| | Inorganic filler | C8 | | | | | | | | | |
| | Organic filler | C9 | | 30 | | | | | | | |
| | Plasticizer | D1 | | 15 | 0 | 0 | 0 | 15 | 15 | 0 | 15 |
| | Pentaerythritol | — | | 1 | 1 | 0 | 0 | 0 | 0 | 1 | 1 |
| Injection molding | Mold time | second | | 20 | 20 | >60 | >60 | >60 | >60 | 20 | 25 |
| Mechanical property of specimen | Izod impact strength | J/m | | 70 | 20 | 30 | 21 | 34 | 58 | 27 | 36 |
| | HDT | ° C. | | 110 | 125 | 120 | 123 | 109 | 108 | 122 | 112 |
| State of specimen | Bloom | — | | Excellent | Excellent | — | — | Excellent | Excellent | Poor | Poor |

As shown in Table 2, since pentaerythritol was not added in Comparative Examples 4 to 7, the demold time was more than 60 seconds. In Comparative Example 8, the demold time of the molded article was 20 seconds, that is, excellent. However, since the inorganic filler and the plasticizer were not added, the Izod impact strength was 27 J/m, that is, low. In Comparative Example 9, the demold time of the molded article was 25 seconds, that is, excellent. However, since the inorganic filler was not added, the Izod impact strength was 36 J/m, that is, the improvement effect of the Izod impact strength was low. On the other hand, the inorganic filler, the plasticizer, and the pentaerythritol were used in Examples 13 to 22. As a result, the demold time in the injection molding was equal to or less than 25 seconds. Further, the Izod impact strengths in Examples 13 to 22 were higher than that in Comparative Example 9 in which the inorganic filler was not added. The HDTs in Examples 13 to 22 were higher than that in Comparative Example 7 in which the pentaerythritol was not added.

It was found from a comparison between Examples 13 to 21 and Example 22 that by using the pentaerythritol, the inorganic filler, and the plasticizer, the demold time became short, and in addition, the impact resistance improved by synergistic actions, and the bloom of the plasticizer did not occur.

Examples 23 to 29 and Comparative Example 10

The pellet of the aliphatic polyester resin composition was produced at the compounding ratios shown in Table 3 in the same manner as in Example 13. The demold time in the injection molding and the Izod impact strength of the specimen obtained by the injection molding were measured, and the bloom was evaluated. Results were shown in Table 3.

same manner as in Example 1. The demold time in the injection molding and the Izod impact strength and HDT of the obtained specimen were measured. Results were shown in Table 4.

TABLE 4

| | | | Examples | | |
|---|---|---|---|---|---|
| | | | 30 | 31 | 32 |
| Raw material | Polyhydroxyalkanoate | A2 | 100 | | |
| | Polyhydroxyalkanoate | A3 | | 100 | |
| | Polyhydroxyalkanoate | A4 | | | 100 |
| | Inorganic filler | C1 | 30 | 30 | 30 |
| | Plasticizer | D2 | 5 | 10 | 5 |
| | Pentaerythritol | — | 1 | 0.7 | 1 |
| Injection molding | Mold time | second | 25 | 20 | 30 |
| Mechanical property of specimen | Izod impact strength | J/m | 42 | 38 | 48 |
| | HDT | ° C. | 101 | 133 | 100 |
| State of specimen | Bloom | — | Excellent | Excellent | Excellent |

The pentaerythritol, the inorganic filler, and the plasticizer were used in Examples 30 to 32. As a result, it was found that: the demold time in the injection molding was short; the bloom did not occur; the Izod impact strength and the HDT were high; and the processability, the impact resistance, and the heat resistance were excellent.

The invention claimed is:

1. An aliphatic polyester resin composition comprising: a polyhydroxyalkanoate (A); pentaerythritol (B); and a filler (C),
    wherein
    the polyhydroxyalkanoate (A) is at least one selected from the group consisting of poly(3-hydroxybutyrate-co-3-

TABLE 3

| | | | Examples | | | | | | | Comparative Example |
|---|---|---|---|---|---|---|---|---|---|---|
| | | | 23 | 24 | 25 | 26 | 27 | 28 | 29 | 10 |
| Raw material | Polyhydroxyalkanoate | A1 | 100 | 100 | 100 | 100 | 100 | 100 | 100 | 100 |
| | Inorganic filler | C1 | 10 | 50 | 30 | 30 | 50 | | | |
| | Inorganic filler | C6 | | | | | | 10 | 50 | |
| | Plasticizer | D1 | 15 | 15 | 5 | 10 | 20 | 15 | 15 | 30 |
| | Pentaerythritol | — | 1 | 1 | 1 | 1 | 1 | 1 | 1 | 1 |
| Injection molding | Mold time | second | 20 | 20 | 20 | 20 | 20 | 25 | 20 | 25 |
| Mechanical property of specimen | Izod impact strength | J/m | 45 | 59 | 37 | 48 | 67 | 40 | 45 | 43 |
| | HDT | ° C. | 113 | 117 | 120 | 118 | 112 | 115 | 111 | 101 |
| State of specimen | Bloom | — | Excellent | Excellent | Excellent | Excellent | Excellent | Excellent | Excellent | Poor |

As shown in Table 3, in Comparative Example 10, the demold time was short, and the Izod impact strength was high. However, the bloom of the plasticizer occurred. On the other hand, the pentaerythritol, the inorganic filler, and the plasticizer were used in Examples 23 to 29. As a result, it was found that: the demold time in the injection molding was short; the Izod impact strength and the HDT were high; the processability, the impact resistance, and the heat resistance were excellent; and the bloom did not occur.

Examples 30 to 32

The pellet of the aliphatic polyester resin composition was produced at the compounding ratios shown in Table 4 in the hydroxyvalerate), poly(3-hydroxybutyrate-co-3-hydroxyhexanoate), and poly(3-hydroxybutyrate-co-4-hydroxybutyrate), the filler (C) is an inorganic filler, an organic filler or a combination thereof, wherein the inorganic filler is at least one selected from the group consisting of silicate, carbonate, sulfate, and nitride, and the organic filler is made from at least one selected from a woody material and an organic fiber, an amount of the filler (C) is from 10 to 100 parts by weight based on 100 parts by weight of the polyhydroxyalkanoate (A), and an amount of the pentaerythritol (B) is from 0.3 to 5 parts by weight based on 100 parts by weight of the polyhydroxyalkanoate (A).

2. The aliphatic polyester resin composition according to claim 1, wherein the filler (C) is the inorganic filler.

3. The aliphatic polyester resin composition according to claim 1, wherein the filler (C) is the organic filler.

4. The aliphatic polyester resin composition according to claim 1, wherein the organic filler is made from a woody material selected from the group consisting of wood chips, wood powder, saw dust, and a combination thereof.

5. The aliphatic polyester resin composition according to claim 1, further comprising a plasticizer (D).

6. The aliphatic polyester resin composition according to claim 5, wherein an amount of the plasticizer (D) is from 1 to 30 parts by weight based on 100 parts by weight of the polyhydroxyalkanoate (A).

7. The aliphatic polyester resin composition according to claim 5, wherein the plasticizer (D) is a modified glycerin-based compound.

8. The aliphatic polyester resin composition according to claim 7, wherein the modified glycerin-based compound comprises at least one selected from the group consisting of glycerol diacetate monolaurate, glycerol diacetate monooleate, glycerol monoacetate monostearate, glycerol diacetate monocaprylate, glycerol diacetate monodecanoate, and glycerol triacetate.

9. An aliphatic polyester resin molded article obtained by molding the aliphatic polyester resin composition according to claim 1.

10. The aliphatic polyester resin composition according to claim 1, wherein the amount of the filler (C) is from 10 to 50 parts by weight based on 100 parts by weight of the polyhydroxyalkanoate (A).

11. The aliphatic polyester resin composition according to claim 1, wherein the inorganic filler comprises at least one selected from the group consisting of talc, mica, kaolinite, calcium carbonate, barium sulfate, and boron nitride.

12. The aliphatic polyester resin composition according to claim 1, wherein the organic filler is made from at least one selected from the group consisting of wood powder and cellulose fiber.

13. An aliphatic polyester resin composition comprising: polyhydroxyalkanoate (A); a crystal nucleating agent comprising pentaerythritol (B); and a filler (C), wherein the polyhydroxyalkanoate (A) is at least one selected from the group consisting of poly(3-hydroxybutyrate-co-3-hydroxyvalerate), poly(3-hydroxybutyrate-co-3-hydroxyhexanoate), and poly(3-hydroxybutyrate-co-4-hydroxybutyrate), the filler (C) is an inorganic filler, an organic filler or a combination thereof, wherein the inorganic filler is at least one selected from the group consisting of silicate, carbonate, sulfate, and nitride, and the organic filler is made from at least one selected from a woody material and an organic fiber, an amount of the filler (C) is from 10 to 100 parts by weight based on 100 parts by weight of the polyhydroxyalkanoate (A), and an amount of the pentaerythritol (B) is from 0.3 to 5 parts by weight based on 100 parts by weight of the polyhydroxyalkanoate (A).

14. The aliphatic polyester resin composition according to claim 13, further comprising a plasticizer (D).

15. The aliphatic polyester resin composition according to claim 1, wherein the filler (C) comprises at least one selected from the group consisting of talc, mica, kaolinite, calcium carbonate, barium sulfate, boron nitride, wood powder, and cellulose fiber.

16. The aliphatic polyester resin composition according to claim 1, wherein the filler (C) comprises silicate, carbonate, sulfate, nitride, wood powder or cellulose fiber.

17. The aliphatic polyester resin composition according to claim 1, wherein the polyhydroxyalkanoate (A) is poly(3-hydroxybutyrate-co-3-hydroxyvalerate), poly(3-hydroxybutyrate-co-3-hydroxyhexanoate), or poly(3-hydroxybutyrate-co-4-hydroxybutyrate).

18. The aliphatic polyester resin composition according to claim 13, wherein the filler (C) is the inorganic filler.

19. The aliphatic polyester resin composition according to claim 13, wherein the filler (C) is the organic filler.

20. The aliphatic polyester resin composition according to claim 14, wherein an amount of the plasticizer (D) is from 1 to 30 parts by weight based on 100 parts by weight of the polyhydroxyalkanoate (A).

\* \* \* \* \*